(12) United States Patent
Wirtz et al.

(10) Patent No.: US 12,043,818 B2
(45) Date of Patent: Jul. 23, 2024

(54) APPARATUS FOR EXTRACTING OIL FROM PLANT MATERIAL

(71) Applicant: MACH Technologies, Detroit, MI (US)

(72) Inventors: Robert N. Wirtz, Royal Oak, MI (US); Jason T. Wirtz, Royal Oak, MI (US); John W. Wirtz, II, Fort Gratiot, MI (US)

(73) Assignee: MACH Technologies, Detroit, MI (US)

( * ) Notice: Subject to any disclaimer, the term of this patent is extended or adjusted under 35 U.S.C. 154(b) by 680 days.

(21) Appl. No.: 17/187,070

(22) Filed: Feb. 26, 2021

(65) Prior Publication Data

US 2021/0269737 A1    Sep. 2, 2021

Related U.S. Application Data

(60) Provisional application No. 63/006,343, filed on Apr. 7, 2020, provisional application No. 62/982,188, filed on Feb. 27, 2020, provisional application No. 62/982,180, filed on Feb. 27, 2020.

(51) Int. Cl.
*C11B 1/10*      (2006.01)
*B01D 11/02*    (2006.01)

(52) U.S. Cl.
CPC ............ *C11B 1/10* (2013.01); *B01D 11/0207* (2013.01); *B01D 11/0215* (2013.01); *B01D 11/0288* (2013.01); *B01D 11/0296* (2013.01)

(58) Field of Classification Search
None
See application file for complete search history.

(56) References Cited

U.S. PATENT DOCUMENTS

| | | | |
|---|---|---|---|
| 4,483,458 A | 11/1984 | Minning et al. | |
| 9,327,210 B1 | 5/2016 | Jones | |
| 9,399,180 B2 | 7/2016 | Ellis et al. | |
| 9,669,328 B2 | 6/2017 | Jones | |
| 9,687,754 B2 | 6/2017 | Ellis | |

(Continued)

FOREIGN PATENT DOCUMENTS

WO    WO-2018215520 A1 * 11/2018

OTHER PUBLICATIONS

Canadian Office Action for Canadian Application No. 3169769 dated Sep. 29, 2023 (4 pages).

(Continued)

*Primary Examiner* — Jennifer A Leung
(74) *Attorney, Agent, or Firm* — Reising Ethington P.C.

(57) ABSTRACT

A plant oil extraction apparatus may include a volatile solvent tank, an oil bearing plant material container for receiving at least some of the volatile solvent, a chiller for cooling volatile solvent to a liquid state in contact with the oil bearing plant material, a vessel for collecting at least some of the mixture of volatile solvent and plant material, a heater for heating at least liquid state volatile solvent to a gas state, a compressor for compressing volatile solvent gas to a higher pressure, and a heat exchanger to cool and condense at least part of the compressed solvent gas to a liquid state and to return at least part of the condensed liquid volatile solvent to the solvent tank. The cycling of the apparatus may at least in part be controlled by an electronic controller and a human machine interface may be used by an operator to input data to the electronic controller.

16 Claims, 11 Drawing Sheets

(56) References Cited

U.S. PATENT DOCUMENTS

| | | | |
|---|---|---|---|
| 9,757,664 B2* | 9/2017 | McGhee | C11B 9/025 |
| 10,232,286 B1* | 3/2019 | Havelick | E04H 5/02 |
| 10,507,407 B2 | 12/2019 | Galyuk | |
| 10,814,248 B2 | 10/2020 | Galyuk | |
| 2011/0035996 A1 | 2/2011 | Herndon | |
| 2011/0122120 A1 | 6/2011 | McGhee | |
| 2011/0133120 A1 | 6/2011 | McGhee | |
| 2014/0369893 A1 | 12/2014 | Ellis et al. | |
| 2016/0303490 A1 | 10/2016 | Ellis | |
| 2016/0346339 A1 | 12/2016 | Finley et al. | |
| 2018/0099017 A1 | 4/2018 | Jones | |
| 2018/0264379 A1* | 9/2018 | Noble | B01D 11/0219 |
| 2019/0046998 A1 | 2/2019 | Stephens et al. | |
| 2019/0121771 A1 | 4/2019 | Kadgi | |
| 2019/0151771 A1 | 5/2019 | Thomas | |
| 2019/0241536 A1 | 8/2019 | Durkacz et al. | |
| 2019/0308116 A1* | 10/2019 | Brodersen | B01D 11/0207 |
| 2020/0017889 A1 | 1/2020 | Poulos et al. | |

OTHER PUBLICATIONS

International Search Report for PCT/US21/19926 filed Feb. 26, 2021, mailed on May 6, 2021. 2 pages.

International Preliminary Report on Patentability for International Application No. PCT/US2021/019926 dated Aug. 30, 2022 (5 pages).

* cited by examiner

APPARATUS FOR EXTRACTING OIL FROM PLANT MATERIAL

PROVISIONAL APPLICATIONS

This application claims the benefit of U.S. provisional patent applications 62/982,180 filed on Feb. 27, 2020; 62/982,188 filed on Feb. 27, 2020 and 63/006,343 filed on Apr. 7, 2020 the disclosure in its entirety of each of which is incorporated herein by reference.

TECHNICAL FIELD

This invention relates to the extracting of oil from oil bearing plant material and more particularly to an apparatus for extracting such oil using a volatile solvent.

BACKGROUND

Various methods and a variety of manually operable apparatus have been developed for extracting plant oil from oil bearing plant material. Some methods and manual apparatus for doing so are disclosed in U.S. Pat. Nos. 9,687,754; 9,669,328; 9,399,180; and 9,327,210. Usually, an operator needs to be present to manually operate and cycle the apparatus to carry out a process of extracting plant oil from oil bearing plant material. Typically, these apparatus and methods use a flammable usually hydrocarbon-based solvent such as propane, butane, mixtures thereof, ethane, methane, alcohol, and the like. Due to the flammable and explosive nature of these hydrocarbon solvents the extraction apparatus needs to be used in a Class 1, Division 1 (C1D1) room large enough to accommodate both the apparatus and the operator when using the apparatus with the apparatus being at least three feet away from every wall of the room. Thus, such C1D1 rooms are relatively large and expensive since they must enclose both the apparatus and the operator.

Therefore, it would be desirable to have an automated apparatus for extracting plant oils from oil bearing plant material by methods of extraction using a flammable solvent which apparatus did not require being housed in a separate C1D1 room, did not require an operator to be in a C1D1 room and did not require an operator to manually cycle, monitor and operate the extraction apparatus.

SUMMARY

A plant oil extraction apparatus may include a solvent tank for receiving a volatile solvent, a plant material container for receiving volatile solvent from the solvent tank, a chiller for cooling volatile solvent to a liquid state in contact with oil bearing plant material in the material container, a collection vessel for receiving a mixture of volatile solvent and plant oil from the material container, a heater for heating at least liquid state volatile solvent in the collection vessel to a gas state, a compressor for compressing volatile solvent gas from the collection vessel to a higher pressure, a heat exchanger configured to receive compressed volatile solvent gas from the compressor and to cool and condense at least part of the compressed solvent gas to a liquid state and to return at least the liquid volatile solvent from the heat exchanger to the solvent tank.

The apparatus may include a first pressure sensor and a first temperature sensor each associated with the solvent tank, a second temperature sensor and a second pressure sensor each associated with the material container, and/or a third temperature sensor and a third pressure sensor each associated with the collection vessel, and an electronic controller such as a programmable logic controller configured to receive inputs from the temperature sensors and the pressure sensors and to control transfer of volatile solvent from the solvent tank to the material container, to control the chiller to maintain at least part of the solvent in the material container in a liquid state, to control transfer of a mixture of liquid volatile solvent and plant oil to the collection vessel, to control the heater to heat at least part of the liquid solvent in the collection vessel to a gas state, to control transfer of at least part of the solvent gas from the collection vessel to the compressor, and/or to control the transfer of at least some volatile solvent in the liquid state from the heat exchanger to the solvent tank.

In some forms a solvent level sensor may provide an input to the programmable logic controller indicating the level of solvent in a liquid state in the solvent tank or in the material container or both. In some forms a level sensor may provide an input to the programmable logic controller indicating the level of a mixture of plant oil and solvent in a liquid state in the collection vessel.

In some form a weight sensor may provide an input to the programmable logic controller indicative of the weight of liquid volatile solvent in the solvent tank. In some forms the apparatus may include an inlet to supply an inert gas at a superatmospheric pressure to the solvent tank. In some forms a vacuum may be applied to the material container or the collection vessel or both.

In some forms the apparatus may include an enclosure enclosing the solvent tank, material container, collection vessel, compressor, and heat exchanger. Some forms may include an exhaust system for producing a forced air flow through the enclosure and exhausting to the exterior of the enclosure. In some forms the enclosure may include an operator access door movable to closed and open positions and when open spaced above an upper portion of the material container, and an air duct carried by the operator door for producing air flow over at least the upper portion of the material container and into the air duct and to the exterior of the enclosure at a location spaced from the operator door at least when it is open. In some forms a cover may be movably carried by the material container so that it can be manually moved between a first position closing the access opening of the material container and a second open position spaced from and not overlying the access opening. In some forms a material cartridge may be completely received within the material container when the cover closes the access opening.

Some forms may include a fire suppression system with at least one outlet nozzle within and adjacent the top of the enclosure for discharging a fire suppression agent into the interior of the enclosure.

BRIEF DESCRIPTION OF THE DRAWINGS

The following detailed description of certain embodiments and best mode will be set forth with reference to the accompanying drawings in which.

DETAILED DESCRIPTION

Figure 1:
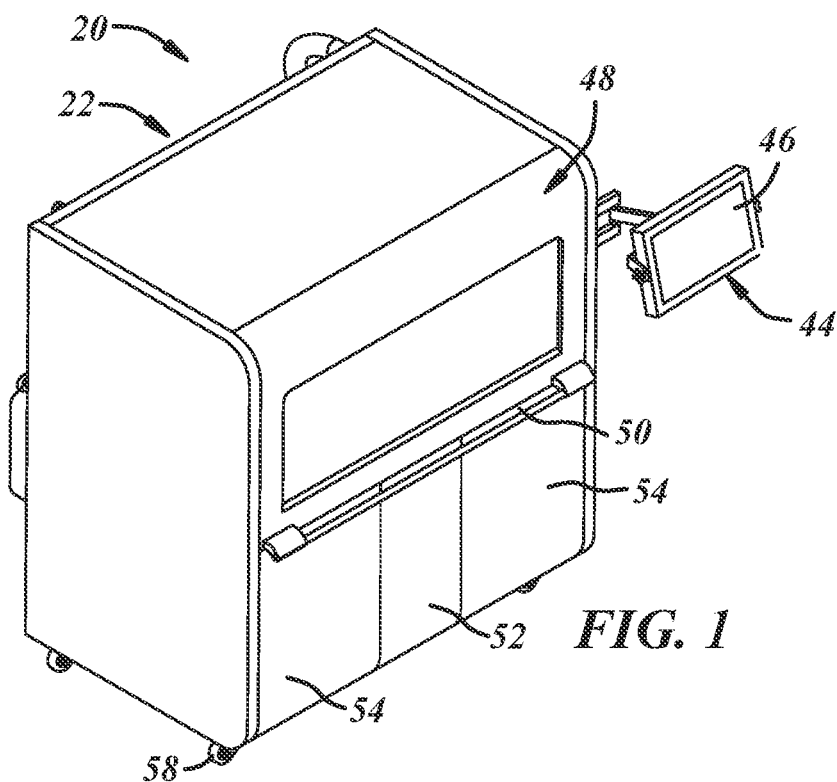
FIG. 1 is a perspective front view of an extraction apparatus with its doors and panels in a closed position.
Figure 2:
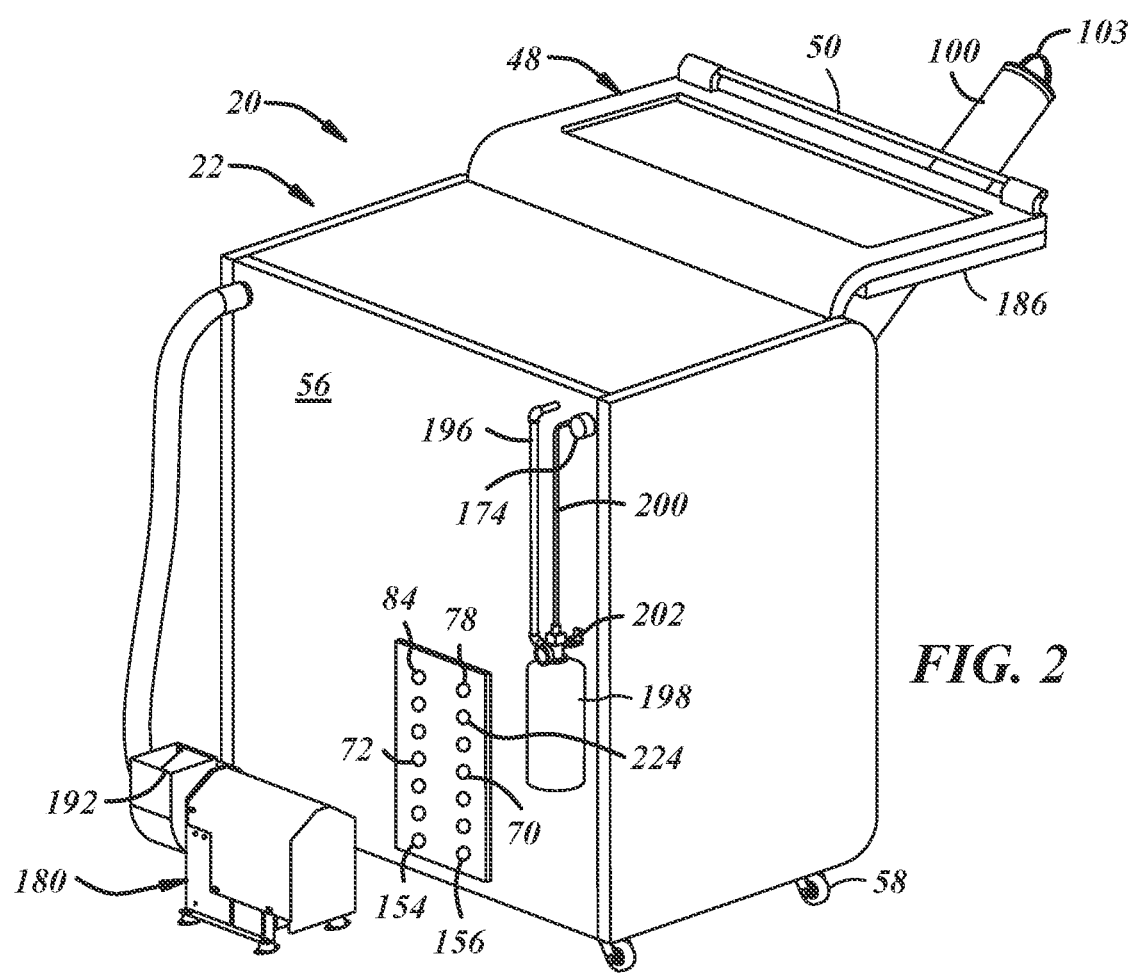
FIG. 2 is a perspective back view of the extraction apparatus of FIG. 1 with an open overhead door and an open material container door.
Figure 3:
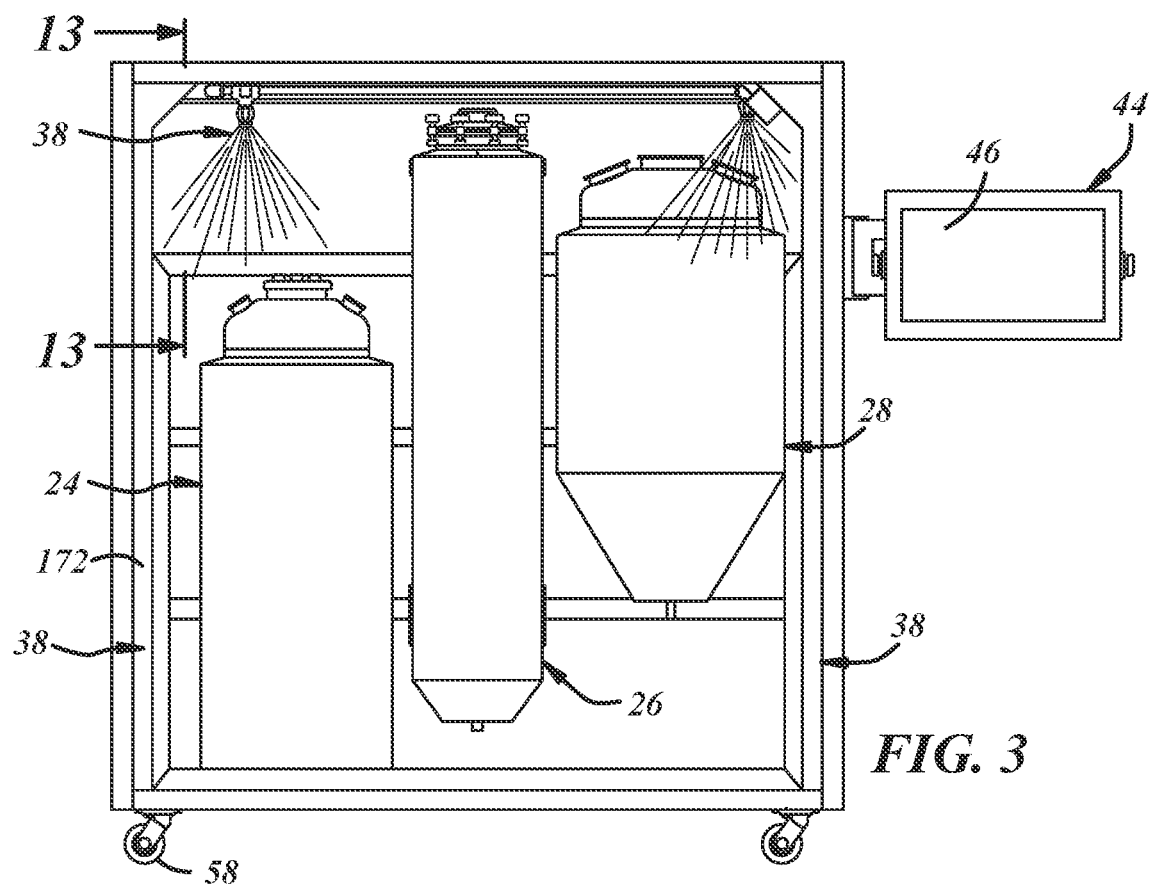
FIG. 3 is a front view of the extraction apparatus with its doors and access panels removed and illustrating various components inside its enclosure.
Figure 4:
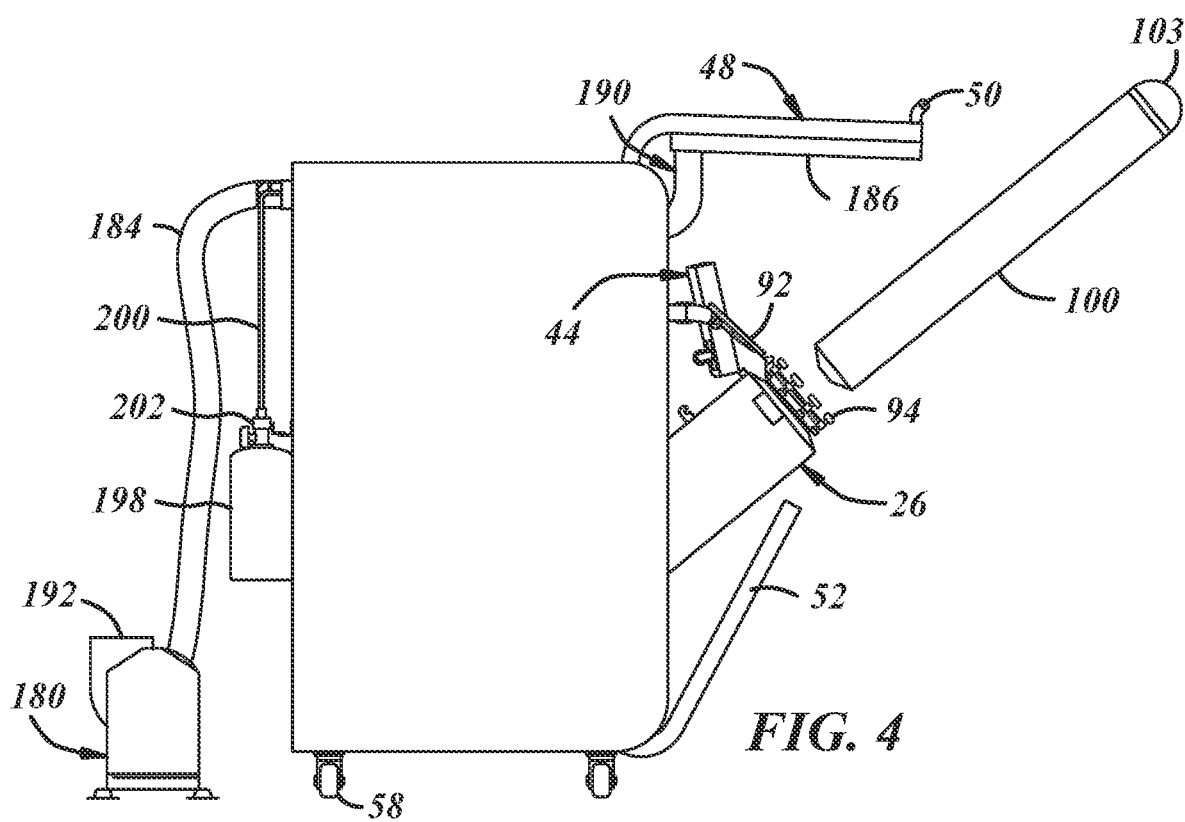
FIG. 4 is a side view of the extraction apparatus with its overhead door and material container door open and its material container in a loading position for receiving or removing a plant material cartridge.

Referring in more detail to the drawing FIGS. 1-3 illustrate an extraction apparatus 20 for removing and recovering oil from plant material which plant oil may be used for various purposes and products depending on the variety of plant material from which it was extracted such as including without limitation perfumes, cosmetics, pharmaceuticals, healthcare, and more recently various medical and recreational *cannabis*-based products. In general, these extraction processes may include without limitation contacting the plant material with a hydrocarbon solvent to remove plant oil from the plant material, collecting the solvent and plant oil, separating the plant oil from the solvent, and recovering the solvent for reuse in extracting plant oil from plant material. Some of the steps of these processes utilize heating and/or cooling of the solvent and maintaining the solvent under appropriate superatmospheric pressure during various steps of the processes and for varying periods of time to try to optimize and maximize the efficiency and/or the extent of extraction of plant oil from the plant material. The optimum time, temperature, and pressure may vary from one plant material to another and/or the particular plant oil it is desired to extract from a given plant material. Typically, these processes may use solvents such as propane, butane, alcohol, ethylene, methane mixtures thereof or other similar volatile hydrocarbon solvents which may be changed from liquid to gaseous states by heating and cooling thereof under various pressures.

As shown in FIGS. 1-3, a plant oil extraction apparatus 20 which is C1D1 compliant may include a cabinet or enclosure 22 with a hydrocarbon solvent tank 24, a plant material container 26 in which plant material may be contacted with the solvent, a separation vessel 28 in which the solvent may be separated from the plant oil, desirably a sieve 30 to remove moisture, a compressor pump 32 and heat exchanger 34 (FIG. 15) for recovering the solvent and returning it to the solvent tank 24, a forced air exhaust system 36, and a fire suppression system 38. The extraction apparatus 20 may also include an electronic controller with a memory such as a programmable logic controller (PLC) 42, an operator human machine interface (HMI) 44 desirably with a display screen 46 and a process and instrumentation diagram (P&ID). The HMI and P&ID enables an operator to enter specific data such as times, temperatures, etcetera for a given process and to monitor the automated implementation of a desired process by the electronic controller or PLC 42 which for at least some functions may include one or more proportional—integral—derivative loops (PID). The enclosure 22 may have a generally rectangular configuration and a front overhead door 48 with a handle 50, a material container access door 52 removable access front panels 54, a removable access back panel 56, and casters 58 to facilitate movement of the apparatus from one location to another.

Figure 5:
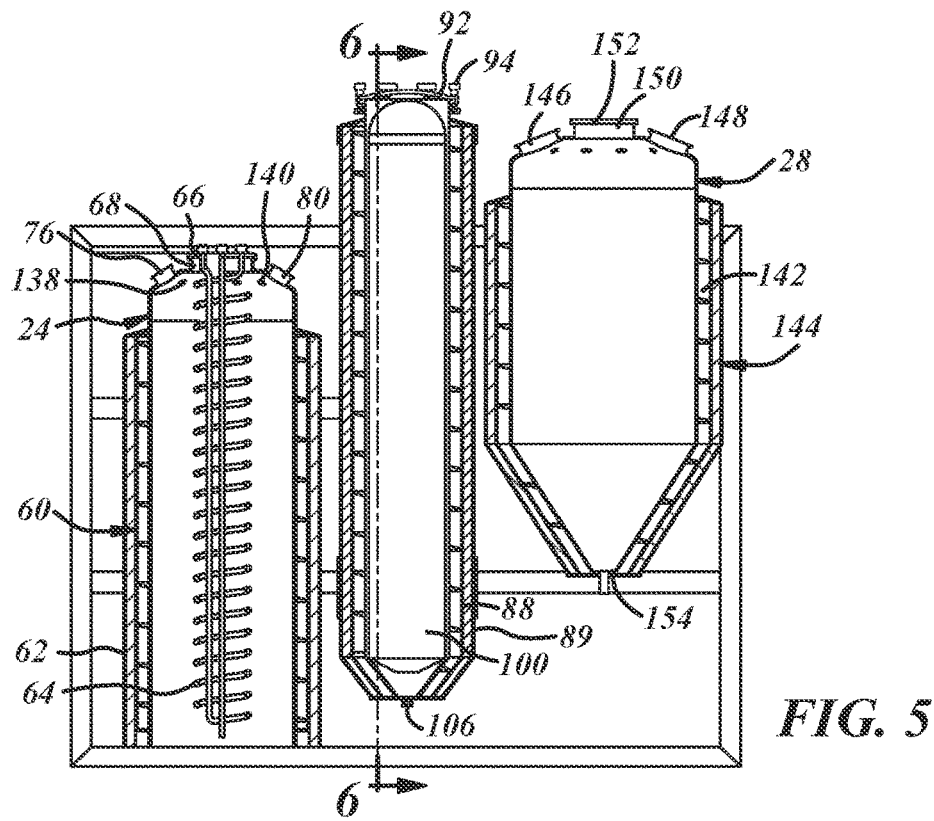
FIG. 5 is a full sectional view of a solvent tank, material container, and collection vessel of the extraction apparatus of FIG. 1.
Figure 15:
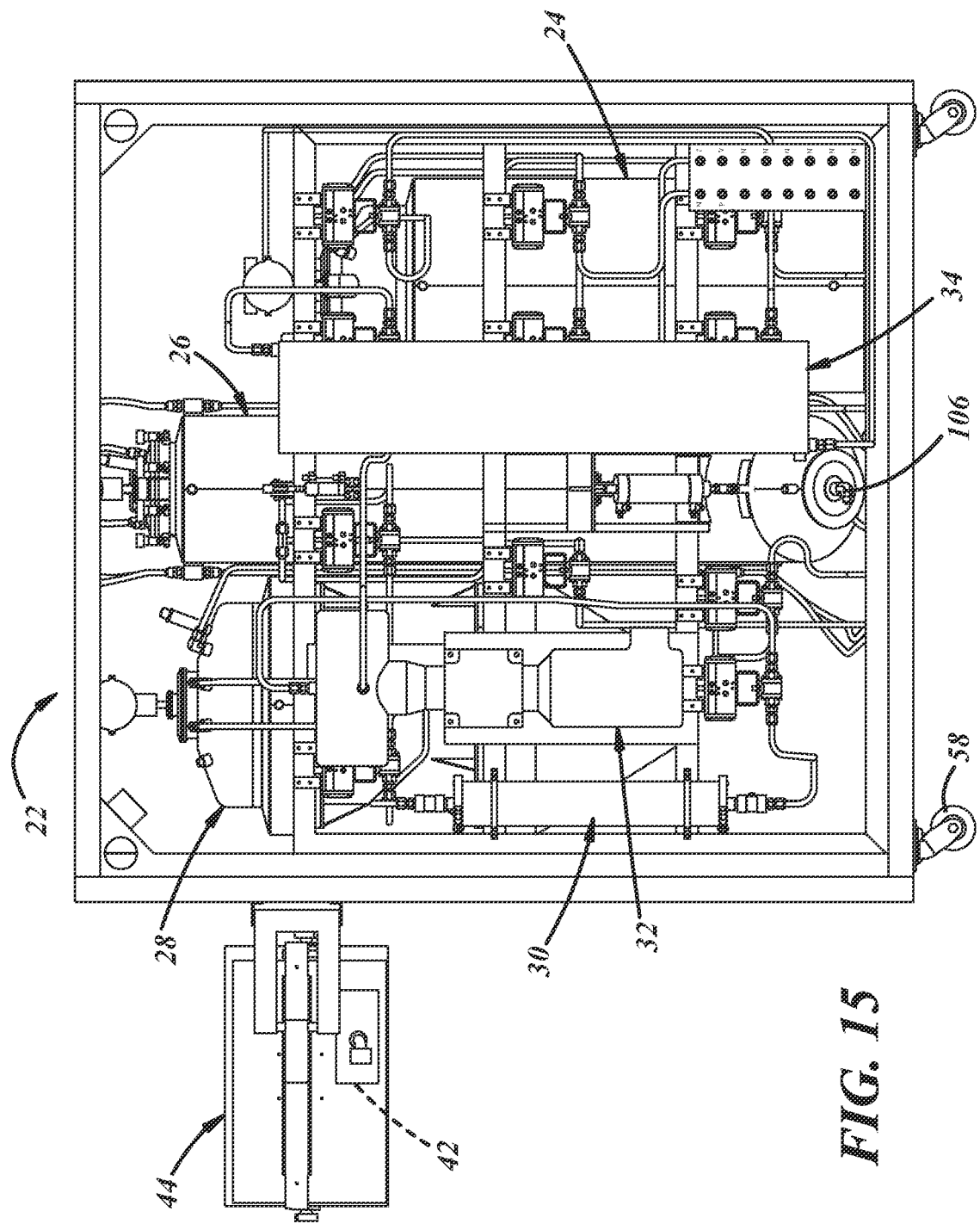
FIG. 15 is a back view of the extraction apparatus with an access panel removed.
Figure 16:
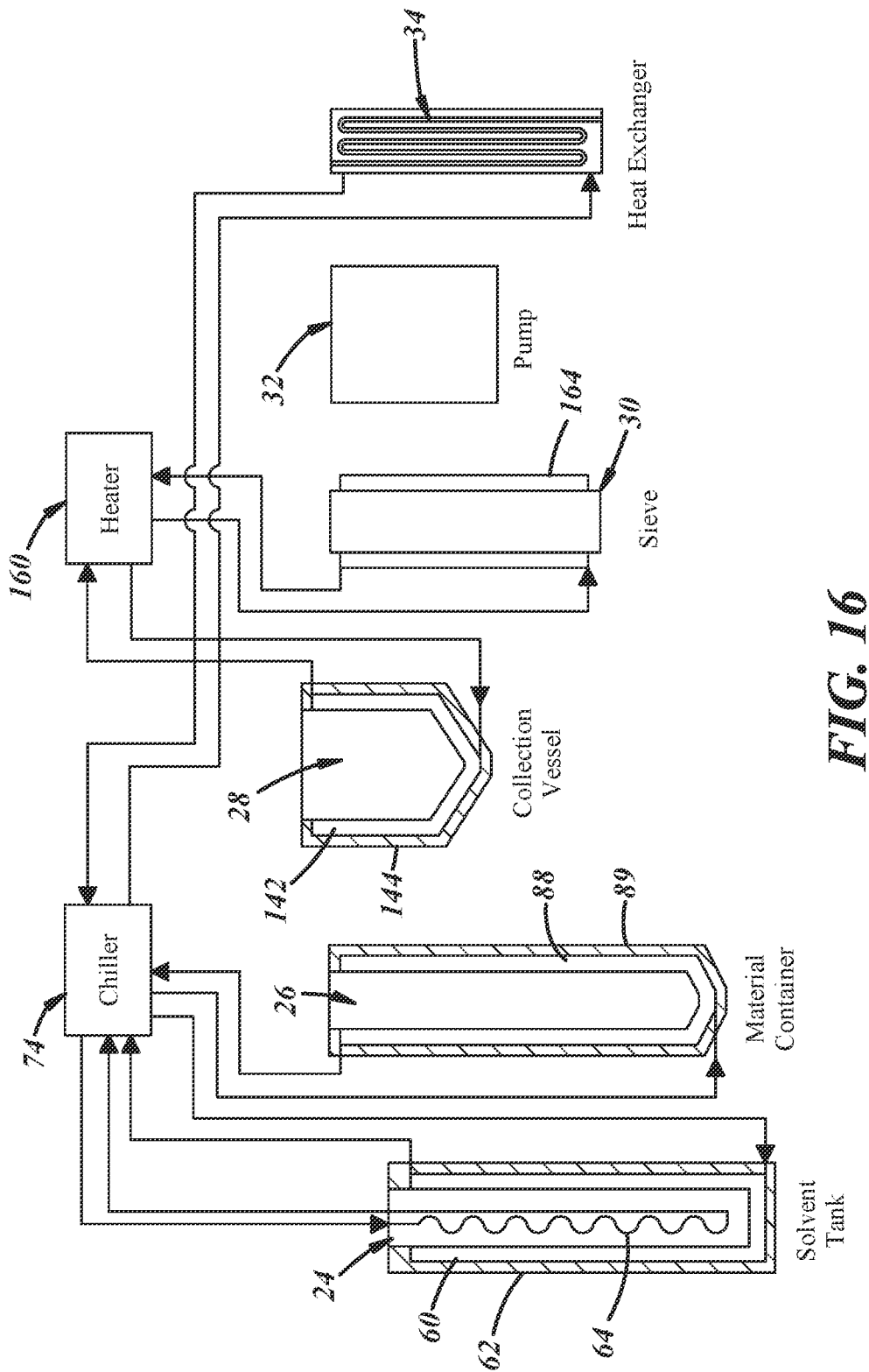
FIG. 16 is a schematic diagram of part of heater and chiller systems of the extractor apparatus.

As shown in FIG. 5, the solvent tank 24 may be encircled by an exterior cooling or chiller coil 60 and an insulator sleeve 62 which desirably may be a thermos double wall enclosing a vacuum. Other insulative sleeves of other materials may also be used. Optionally, a cooling or chiller coil 64 may be received inside the tank and may be carried by a cover 66 removably closing and sealing an access opening 68 through the top of the tank. The cooling coil or coils may be connected by suitable piping to a manifold chiller inlet 70 and outlet 72 connectors accessible from outside of the back of the enclosure (FIGS. 2 and 15). A chiller unit 74 may be connected to these manifold connectors to circulate a fluid coolant and desirably a liquid coolant such as a water and antifreeze mixture through the tank coil(s). The tank may also have a solvent inlet 76 connected by suitable piping to a manifold solvent inlet connector 78 for supplying solvent to the tank and an outlet 80 for delivering solvent from the tank. This tank may also have a nitrogen inlet port 82 connected by suitable plumbing to a manifold nitrogen inlet connector 84 accessible from outside of the back of the enclosure and a solvent return inlet 86. The solvent tank may be made of steel and constructed to withstand sufficient super-atmospheric pressure to maintain the vaporizable solvent in liquid form at exterior atmospheric temperatures within and surrounding the enclosure with a suitable safety margin.

Figure 6:
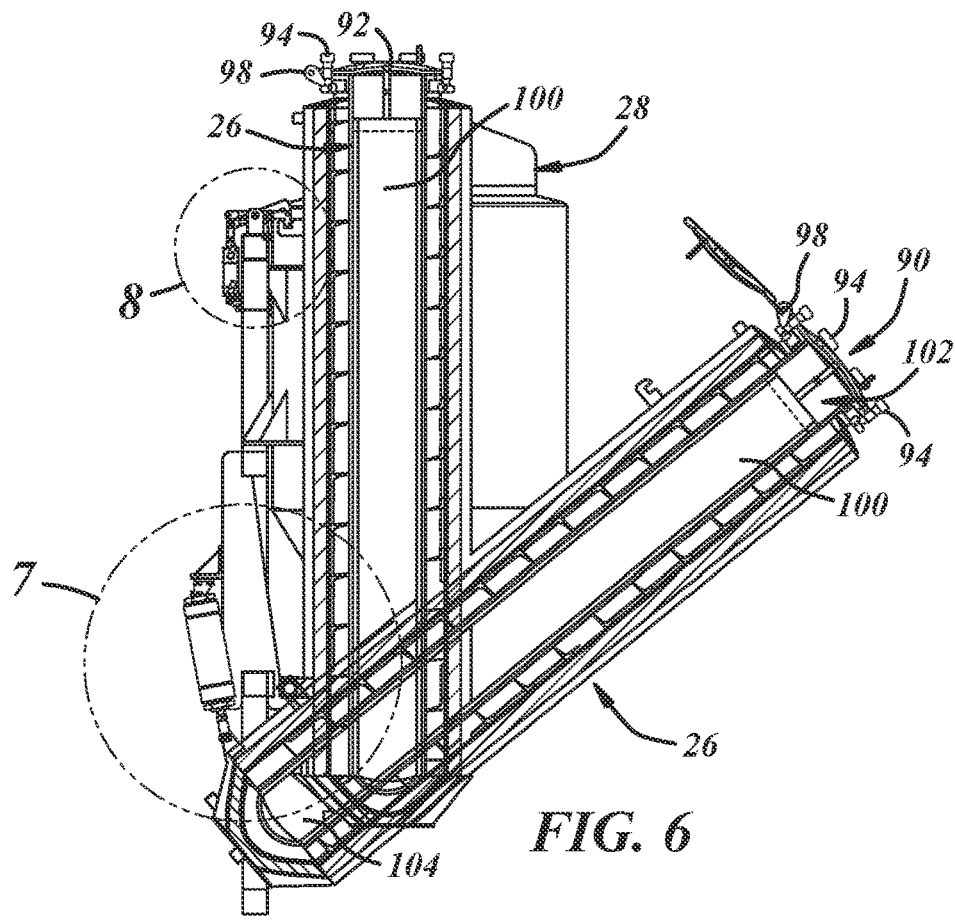
FIG. 6 is a sectional view taken generally on line 6-6 of FIG. 5 and illustrating the material container in both its upright in use position and in its tilted plant material loading and unloading position.

As shown in FIGS. 5 and 6, the plant material container 26 may be surrounded by a cooler or chiller coil 88 and an insulating sleeve 89 which preferably may be two spaced apart walls enclosing a vacuum. The material container may have a top access opening 90 which may be closed and sealed by a readily removable cover 92 which in its closed position may be firmly releasably secured to the container by a series of circumferentially spaced apart threaded fasteners 94 carried by a flange 96 fixed to the container. The cover 92 may be connected to the container by a suitable hinge 98 to facilitate manual opening and closing thereof. When the cover is open a material carrier cartridge 100 may be generally axially inserted into or removed from the container. The cartridge may have an open top 102 with a strap handle 103 and adjacent to the other end a removable filter assembly 104 which may retain plant material in the cartridge, admit solvent into the cartridge, and permit a solvent and extracted plant oil mixture to flow out of the cartridge and into the container 26 and through an outlet 106 adjacent the bottom of the container. The container also has a solvent inlet 108 desirably adjacent a lower portion of the container.

Figure 7:
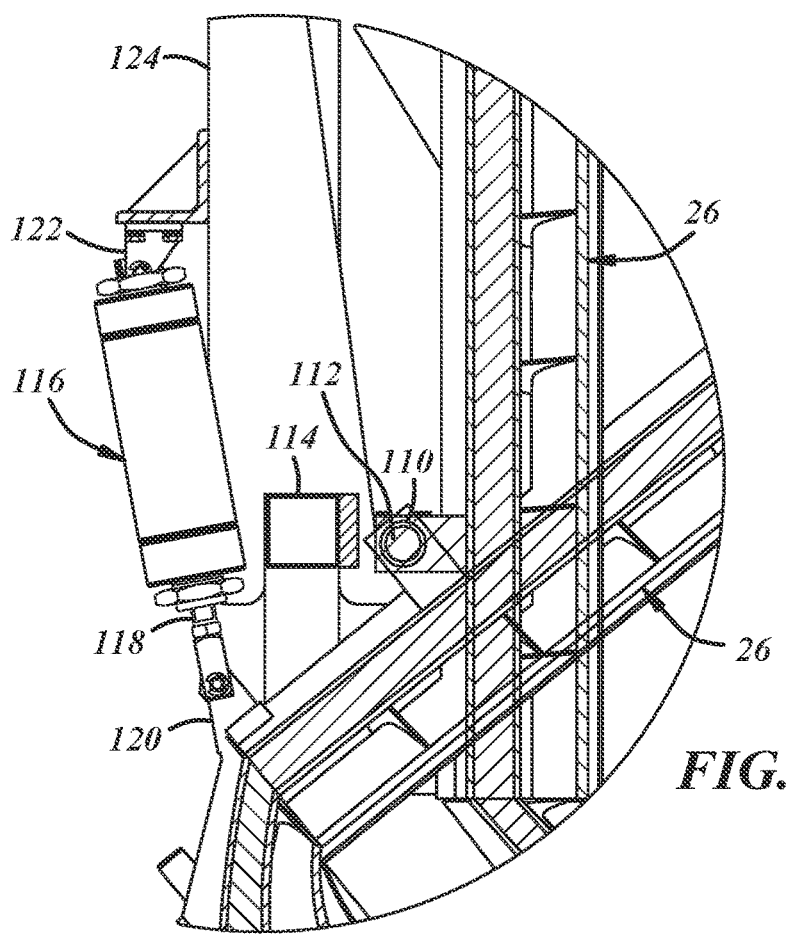
FIG. 7 is an enlarged fragmentary view of the portion in circle 7 of FIG. 6.
Figure 8:
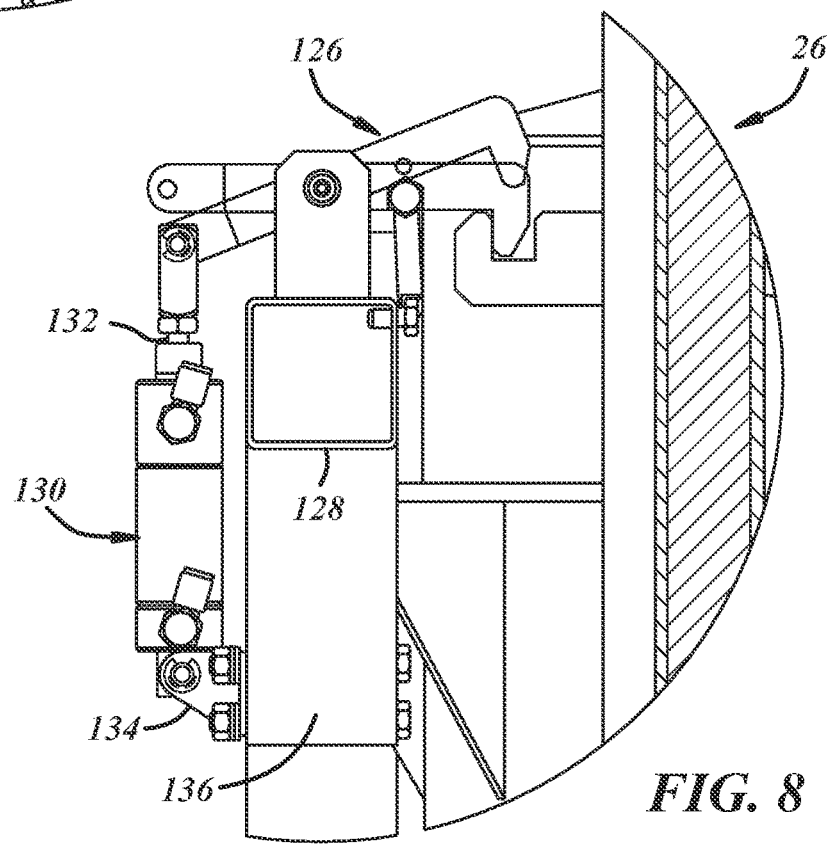
FIG. 8 is an enlarged view of the portion in circle 8 of FIG. 6.

To facilitate insertion into and removal of the material cartridge 100 from the container it may be mounted in the enclosure 22 to be movable as shown in FIG. 6 from an upright position completely within the enclosure to a tilted outward position in which the upper portion of the container and its access opening 90 extends outwardly of the front of the enclosure and desirably underlies the open overhead door 48. As shown in FIGS. 6 and 7 the container may be movably mounted in the enclosure by a sleeve 110 extending transversely of and attached by brackets to the container and rotatably received on a shaft 112 fixed by brackets to a support rail 114 of the enclosure. The container may be moved between its upright and tilted positions by an air cylinder 116 with a piston rod 118 pivotably connected to a bracket 120 fixed to the container and adjacent the other end the cylinder may be pivotably connected to a bracket 122 attached to a support 124 fixed to the rail 114. As shown in FIGS. 6 and 8 the material container 26 may be releasably retained in its upright position inside the enclosure 22 by a latch mechanism 126 carried by an enclosure frame member 128 and actuated by a pneumatic cylinder 130 with a piston rod 132 pivotably connected to the latch mechanism and adjacent the other end the cylinder case may be pivotably attached to a bracket 134 carried by a frame member 136 of the enclosure. The container 26 may have a purge port 138 and a vacuum port 140, desirably adjacent the top of the container.

As shown in FIG. 5, the collection vessel 28 may be encircled by a heater coil 142 surrounded by an insulator sleeve 144 preferably in the form of two spaced apart walls enclosing a vacuum. This vessel may have a solvent and oil mixture inlet 146, gaseous solvent outlet 148 and an access opening 150 with a removable cover 152 each desirably adjacent the top of the vessel, and adjacent its bottom a liquid oil outlet 154. Through suitable conduits with solenoid flow control valves the heater coil 142 may be connected to manifold inlet and outlet connectors 156 & 158 accessible from the exterior of the enclosure. A liquid solvent in the collection vessel may be heated to a gaseous state by a heater unit 160 connected to the manifold inlet 156 and outlet 158 and circulating a heated fluid which is desirably a liquid through the heater coil 142.

For recovery and reuse of the gaseous solvent from the collection vessel 28 it may desirably be passed through a sieve 30 to remove moisture from it (which typically came from the plant material) such as a molecular sieve with 3A and/or 4A sieve beads. A heater coil 164 may be in heat transfer relationship with the sieve 30 and connected to the manifold connectors 156 & 158 so that in use the solvent passing through the sieve is maintained in a gaseous state. The gaseous solvent from the sieve may be compressed such as by the compressor or pump 32 and supplied to the heat exchanger 34 to condense it to a liquid state and then the condensed liquid solvent may be returned to the solvent tank 24. The heat exchanger 34 may be of a conventional construction with condensing coils, shells and tubes, or a plate heat exchanger in which the gaseous solvent is condensed to its liquid state by a coolant such as a liquid coolant circulated through the heat exchanger such as by the cooling unit 74. If all of the gaseous solvent is not condensed to a liquid state by the heat exchanger, any remaining gaseous portion may also be transferred to the solvent tank in which the pressure will rise and condense to a liquid state the remaining gaseous solvent.

Figure 9:
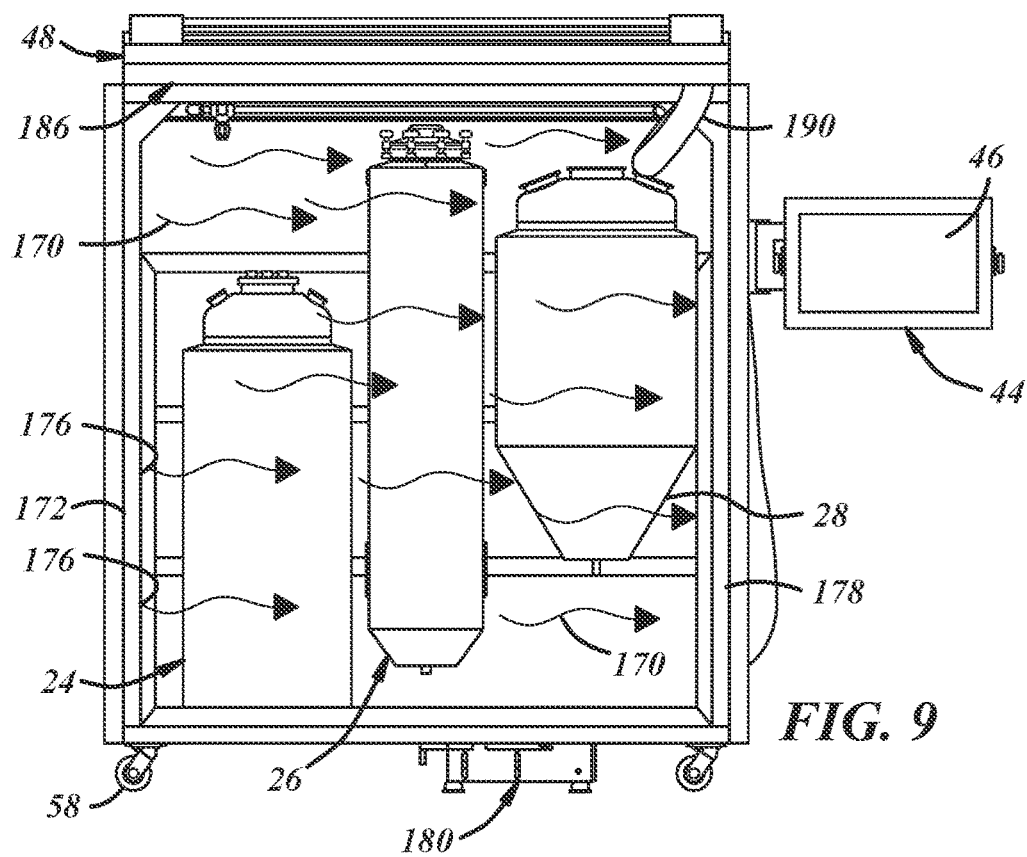
FIG. 9 is a front view of the extraction apparatus with the doors and access panels removed and illustrating the exhaust air flow within the enclosure when the extraction apparatus is in use with its doors and access panels closed.

During operation of the extractor apparatus 20, to create a sub-atmospheric pressure inside the enclosure 22 and if any solvent leaks were to occur in the system to avoid any build-up of flammable solvent gasses within the enclosure, the exhaust system 36 continuously moves air through and across the inside of the enclosure as indicated by the arrows 170 in FIG. 9. This exhaust system may have within the enclosure and desirably along one side wall an inlet air duct 172 communicating with an air inlet opening 174 to the exterior of the enclosure and having a plurality of air vents or slots 176 through which air may flow into the enclosure and on the other side wall an outlet air duct 178 communicating with an explosion proof exhaust fan 180 preferably disposed outside of the enclosure. The outlet air duct 178 may have a series of vents such as slots 182 through which air may flow into the duct when the exhaust fan is operating. The exhaust fan may communicate with the outlet duct through a suitable hose or pipe 184 as shown in FIG. 2.

Figure 10:
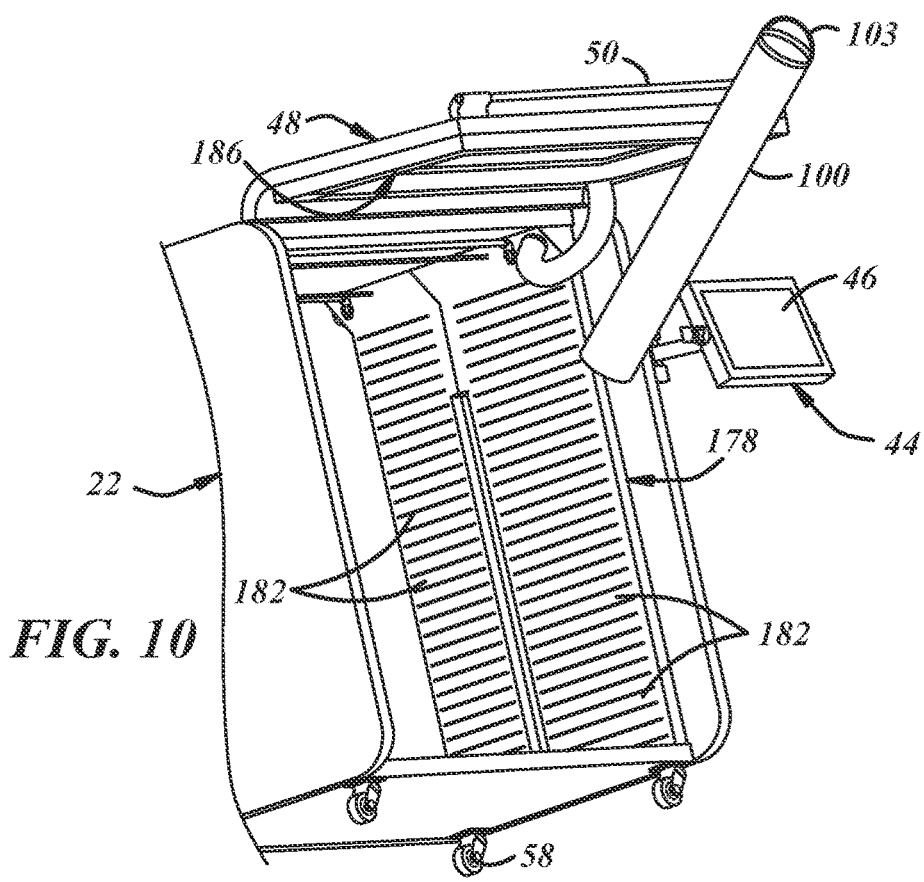
FIG. 10 is a perspective view illustrating part of the air exhaust system ductwork.
Figure 11:
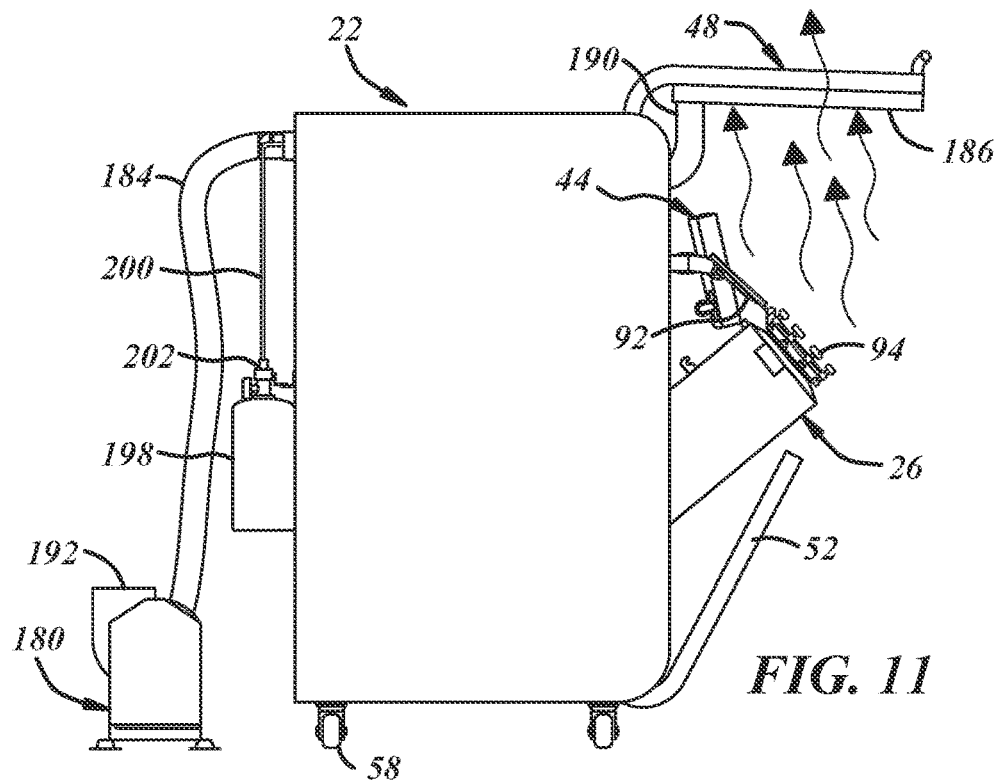
FIG. 11 is a side view illustrating the exhaust system air flow when the overhead door is open and the material container is in its tilted position for removal of a cartridge containing plant material from the container.
Figure 12:
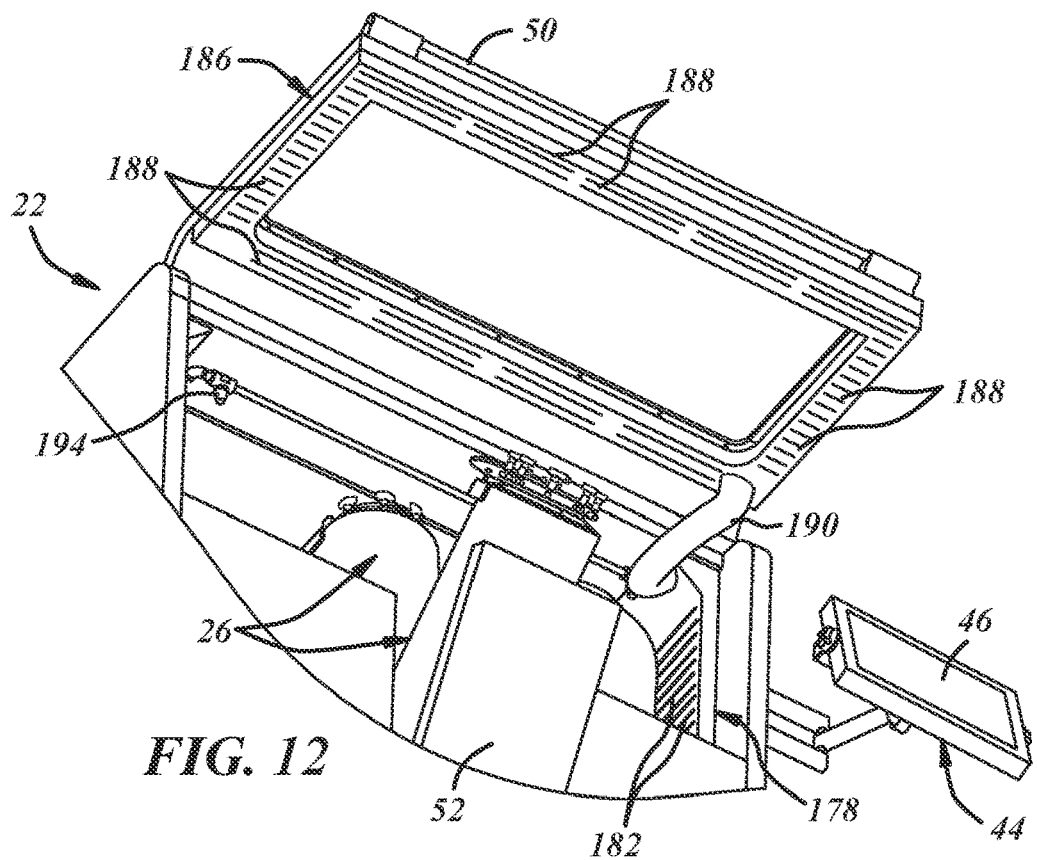
FIG. 12 is a fragmentary isometric view illustrating the exhaust air ductwork carried by the overhead door.

As shown in FIGS. 10-12 when the overhead door 48 is open, such as for an operator opening the cover 92 of the material container 26 for removal or insertion of a material cartridge 100, the underside of the overhead door also carries a duct 186 communicating with the exhaust fan and having a series of vents or slots 188 to ensure that any residual solvent gases are also evacuated through the exhaust fan 180 and thus do not enter into the atmosphere surrounding the exterior of the enclosure. This duct may be connected by a flexible hose 190 to the outlet duct 178 and thus the exhaust fan. Desirably when the overhead door 48 is open the flow rate of the exhaust fan may be increased to ensure that any gaseous solvent does not escape to the atmosphere surrounding the exterior of the enclosure. The outlet 192 of the exhaust fan may be piped to the exterior of a building in which the extractor apparatus 20 is used to avoid the buildup of any gaseous flammable solvent within the building or room in which the extractor apparatus is operated or used.

Figure 13:
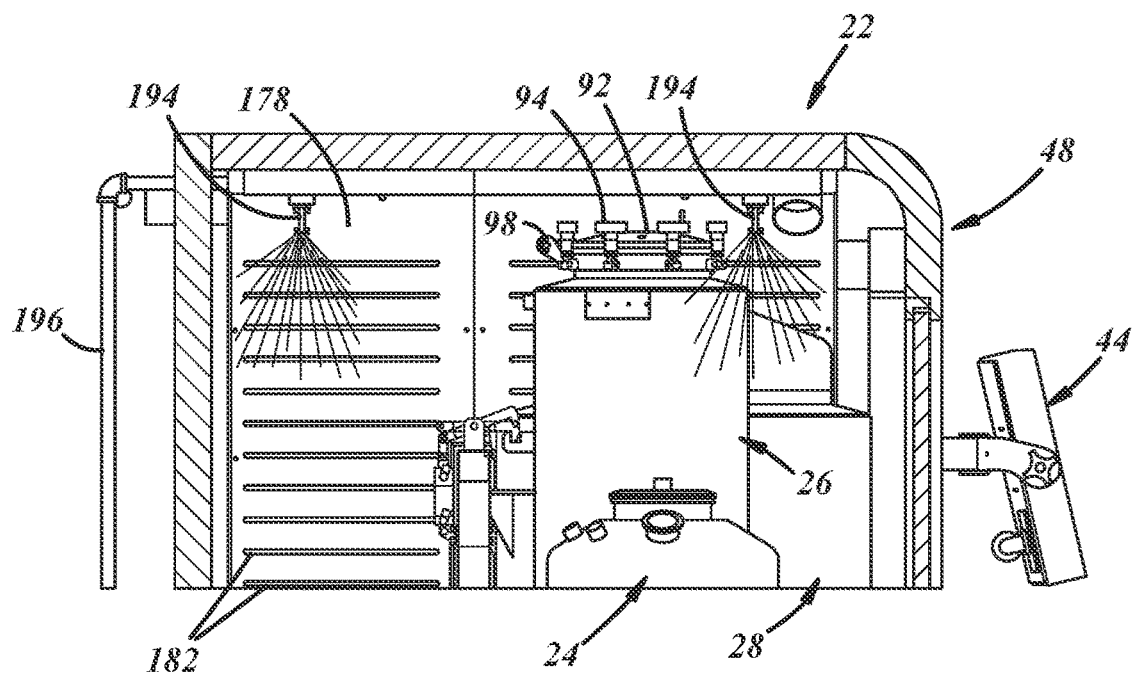
FIG. 13 is a fragmentary sectional view taken on line 13-13 of FIG. 3 illustrating spray heads of a fire suppression system of the extractor apparatus.
Figure 14:
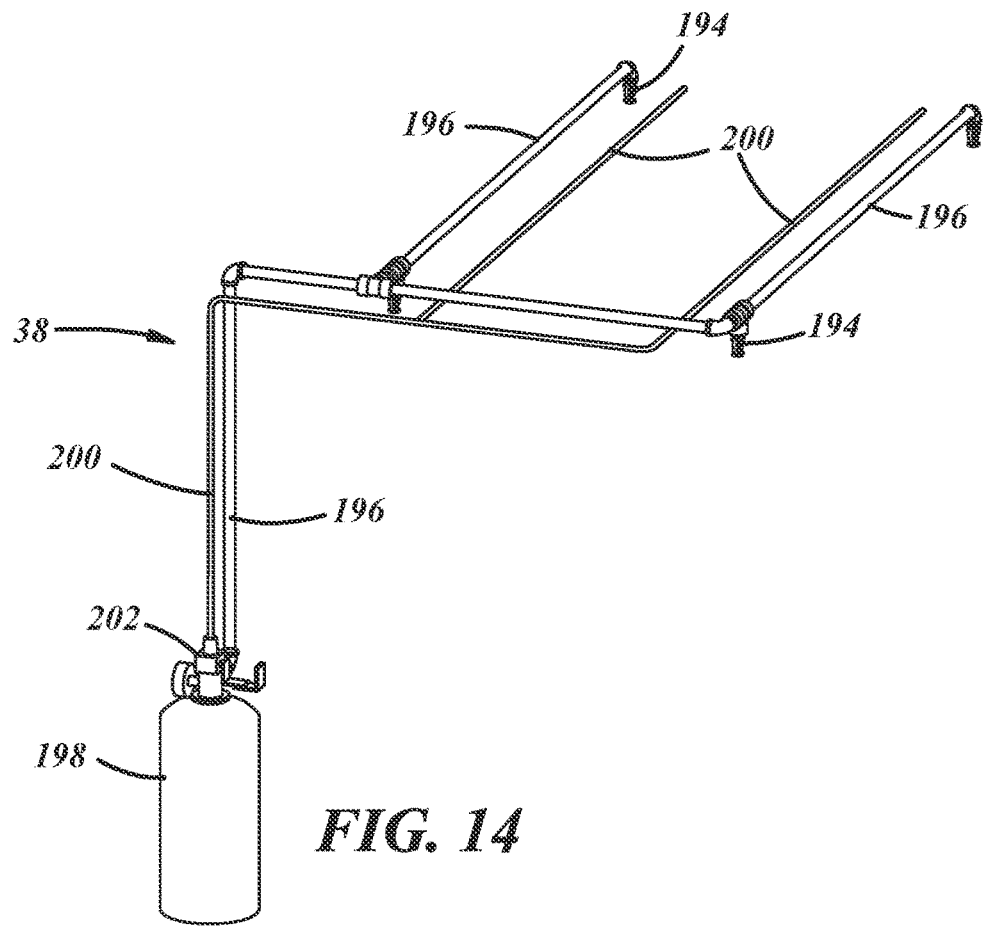
FIG. 14 is a somewhat diagrammatic isometric view of the fire suppression system of the extractor apparatus.

As shown in FIGS. 13 and 14, the enclosure 22 may have the fire suppression system 38 which automatically detects a fire and discharges a fire extinguishing agent within the enclosure. This system may have within the enclosure spray heads 194 connected by suitable conventional plumbing 196 to a pressurized container 198 with a fire extinguishing agent therein which as shown in FIG. 2 is desirably mounted outside of the enclosure to facilitate monitoring and as needed recharging and/or replacing of the container with another freshly charged and pressurized container. This fire extinguishing system may also have sensing tubes 200 inside of the enclosure which communicate with a normally closed discharge valve 202 connected to the container. The sensing tubes are configured so that when they detect sufficient heat (typically produced by a fire) they rupture resulting in a drop in the super-atmospheric pressure within the tubes which activates the valve 202 to discharge a fire extinguishing agent through the spray heads 194 within the enclosure. The fire extinguishing agent may be a Class B agent typically of dry chemical powders, or a film forming foam. This fire extinguishing agent desirably may be dry or multi-purpose dry chemicals such as ammonium phosphate or halogen agents such as Halon 1301 or 1211. Many alternative fire extinguish systems are known to skilled persons and may be used including without limitation a highly pressurized carbon dioxide system.

The chiller unit 74 may through appropriate plumbing and control valves circulate a fluid coolant and desirably a liquid coolant such as a water and antifreeze mixture with rust inhibitors through the cooling coil(s) of the solvent tank 24, material container 26, and heat exchanger 34. The chiller unit may circulate a coolant liquid which usually may be in the range of about −90° to −40° C. The chiller unit may be a commercially available refrigeration unit or other chillers known to persons of ordinary skill in the art and desirably may be disposed outside of the enclosure 22 and connected through suitable conduits to coolant inlet and outlet connectors 70 & 72 carried by the manifold and accessible from outside of the enclosure. Typically, solenoid actuated valves may control the flow or flow rate and cycling of the coolant to the solvent tank, material container, and heat exchanger and may be actuated, cycled and controlled by the electronic controller or PLC 42.

The heater unit 160 may supply a heated fluid which is desirably a heated liquid such as a hot water and antifreeze mixture or other suitable liquid to the coil 142 of the collection vessel 28 and coil 164 of the sieve 34 through the connectors 156 & 158 and their associated plumbing and solenoid control valves. Suitable forced circulation liquid heater units are commercially available and known to persons of ordinary skill in the art. The heated fluid supplied to the heating coils of the collection vessel and the sieve usually may be at a temperature in the range of 100 to 160° F. Alternatively, the collection vessel and the sieve may be heated by electric heaters in thermal heat transfer relationship with or within respectively the collection vessel and the sieve.

Figure 17:
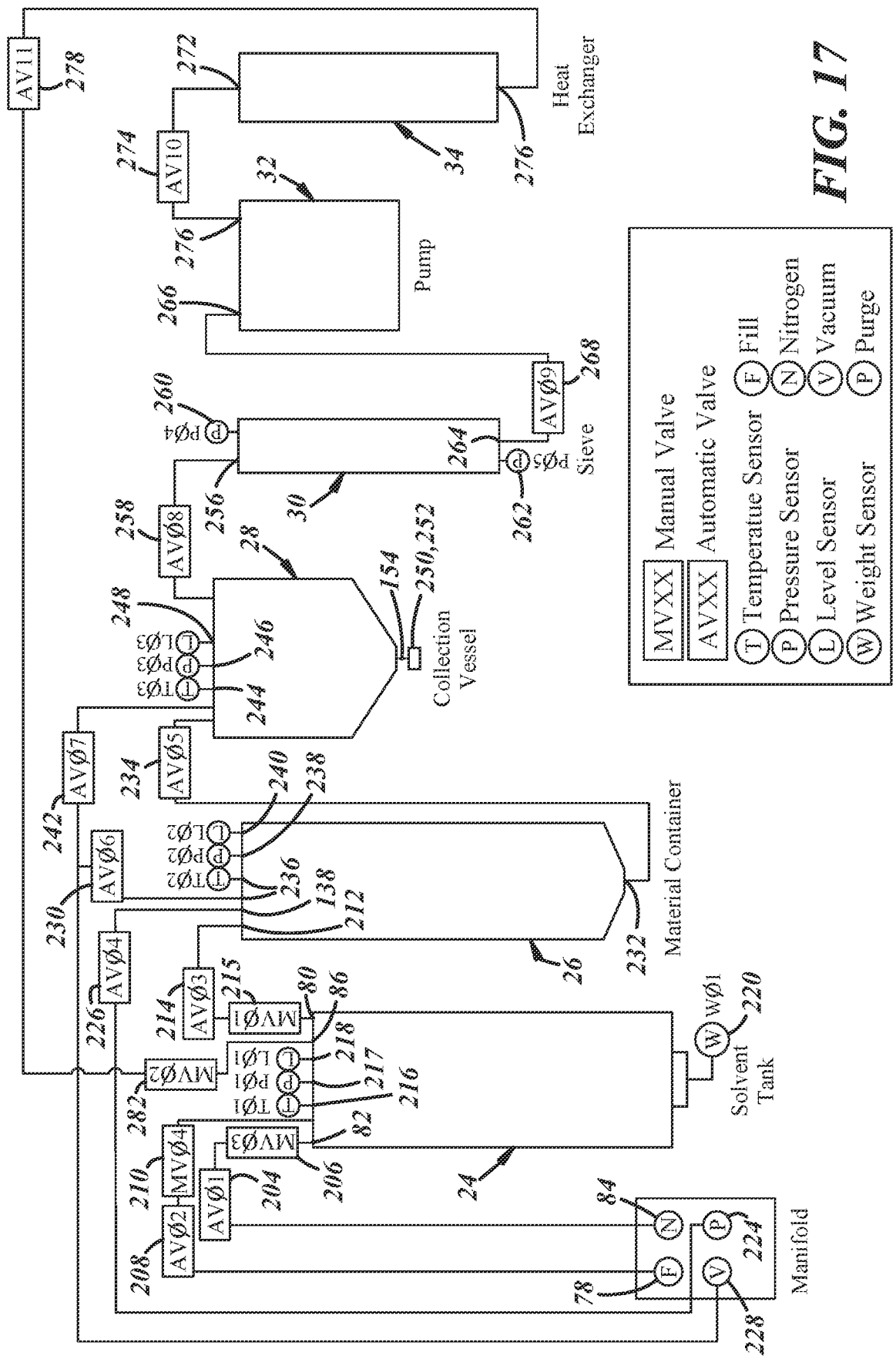
FIG. 17 is a schematic diagram of sensors, valves, and plumbing arrangements of the extractor apparatus of FIG. 1.

As shown schematically in FIG. 17, for automated control of the process carried out by the extraction apparatus various components may be plumbed and connected together through suitable solenoid control valves which may be actuated, cycled and controlled by the electronic controller or PLC 42. The solvent tank 24 may be connected through manifold connector 84 to a source of compressed nitrogen gas through suitable plumbing with a solenoid actuated flow control valve 204 with open and closed states which desirably is in series with a downstream manual shut-off valve 206. Compressed nitrogen gas may be supplied to the solvent tank if and as needed to force liquid solvent from the tank into the material container. The inlet 76 of the solvent tank may be connected through suitable plumbing with a solenoid control valve 208 with open and closed states to the manifold fill port 78 and desirably with a downstream manual shut off valve 210. The outlet 80 of the solvent tank may be connected to the inlet 212 of the material container 26 through suitable plumbing including a solenoid actuated control valve 214 movable to open and closed states and desirably an upstream manual shut off valve 215. To facilitate automatic cycling and control of the valve 204, 208, and 214 by the PLC, a temperature sensor 216, pressure sensor 217, and solvent liquid level sensor 218 may be operably associated with the solvent tank 24 to provide inputs to the PLC. The solvent tank may also have a weight sensor 220 of the weight or quantity of liquid solvent in the tank.

The material container 26 may be connected to a manifold purge connector 224 by suitable plumbing through a solenoid actuated control valve 226 with open and closed states. The material container may also be connected to a manifold vacuum port 228 through suitable plumbing with a solenoid actuated control valve 230 with open and closed states. The outlet 232 of the material container may be connected to an inlet 146 of the collection vessel 28 through suitable plumbing including a solenoid actuated flow control valve 234 with open and closed states. These valves may be cycled and controlled by the PLC 42. To facilitate automatic control by the PLC, a temperature sensor 236, pressure sensor 238, and a solvent liquid level sensor 240 may be operably associated with the material container to provide inputs to the PLC.

The collection vessel 28 may also be connected to the manifold vacuum connector 228 through suitable plumbing including a solenoid actuated control valve 242 movable to open and closed states and cycled and controlled by the PLC. To facilitate automatic operation, a temperature sensor 244, pressure sensor 246, and liquid level sensor 248 may be associated with the collection vessel to provide inputs to the PLC. The outlet 154 for plant oil of the collection vessel may be connected to either a manual valve 250 movable to open and closed states by the operator or desirably connected to an outlet connector (not shown) accessible from the exterior of the enclosure through suitable plumbing including a solenoid actuated flow control valve 252 movable to open and closed states and controlled through the PLC and the operator by the HMI interface.

The gaseous solvent may flow from the collection vessel outlet 148 to an inlet 256 of the sieve 30 through suitable plumbing including a solenoid actuated flow control valve 258 movable to open and closed states. The sieve may have an associated inlet pressure sensor 260 and an outlet pressure sensor 262 which may provide inputs to the PLC. A sieve outlet 264 for gaseous solvent may be connected to the inlet 266 of the compressor or pump 32 through appropriate plumbing including a solenoid actuated control valve 268 movable to open and closed states. The outlet 270 of the compressor or pump may supply compressed gaseous solvent at a higher pressure to a gaseous fluid inlet 272 of the heat exchanger 34 through suitable plumbing including a flow control valve 274 movable to open and closed states and if desired this valve may also be configured to provide a variety of different flow rates between its fully open and fully closed states. An outlet 276 from the heat exchanger of at least predominantly if not only condensed liquid solvent may be returned to the solvent tank 24 through suitable plumbing including a solenoid actuated flow control valve 278 movable to open and closed states and downstream of this valve desirably a manual flow control valve 282. Each of these solenoid valves may be cycled and controlled by the PLC.

As previously stated, the heat exchanger cooling coil is also connected to the manifold inlet and outlet connectors 70 & 72 through suitable plumbing conduits and if desired the inlet may include a solenoid actuated flow control valve movable to open and closed states and if desired to various flow rate states to further facilitate automatic operation by the PLC.

Figure 18:
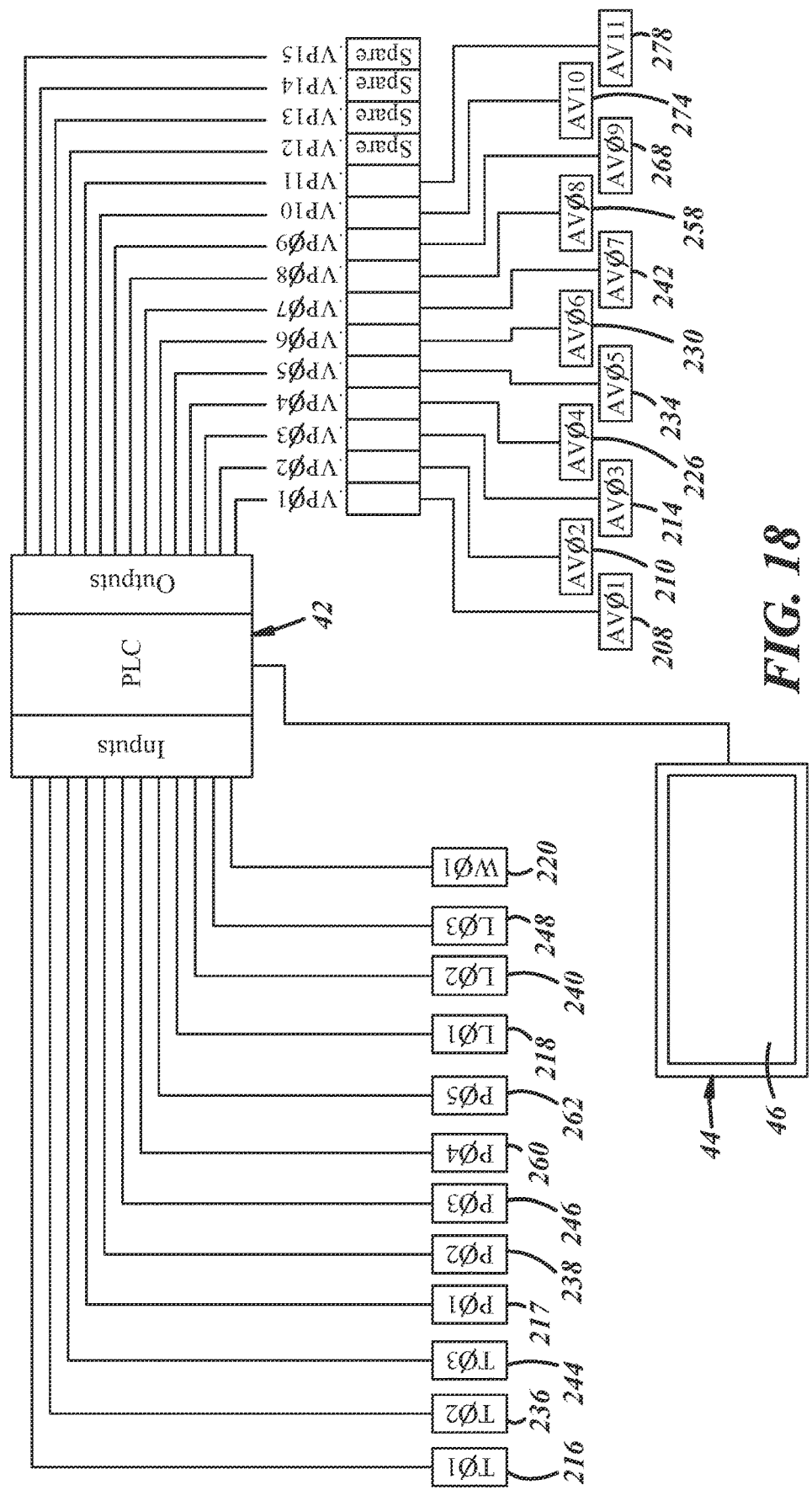
FIG. 18 is a schematic diagram of some of the inputs to and outputs of a programmable logic controller of the extractor apparatus of FIG. 1

As shown schematically in FIG. 18, each of the temperature, pressure, and level sensors and the weight sensor is electrically connected to an input of the PLC and each of the solenoid actuated valves is connected to an output of the PLC typically through a driver to change the state of the valve for automatic control of the particular extraction process being carried out by the PLC.

The HMI 44 is electrically connected to the PLC 42 to enable the operator of the extractor apparatus 20 to enter various times, temperatures, and other variables for running a particular extraction process. Typically, this HMI will also display in a form viewable by the operator the implementation and status of various steps of the specific process being automatically carried out by the extractor apparatus through suitable software and any firmware executed by the PLC to control the various solenoid valves in response to the data inputted by the operator and any needed or desirable inputs from the appropriate temperature, pressure, level and weight sensors. To prepare for an operating cycle of the extractor apparatus 20 an operator may load plant material into the cartridge 100 and insert the cartridge of plant material into the open end 90 of the tilted-out material container 26 and then manually close and seal the cover 92 of the material container with the cartridge fully within the container. The operator may then move the material container to its upright position fully within the enclosure and close the overhead door 48 and the container door 52. If desired proximity sensors or switches may be associated with the overhead door and the container door to indicate whether they are closed and prohibit the beginning of an automated process unless and until they are closed. After the operator has entered the desired time, temperature, etc. data for a specific desired process to be run, the process may be started by pressing or touching a start icon on the operator HMI for the extractor apparatus to take over and automatically run the extraction process. Depending on the data inputted by the operator the PLC may apply a vacuum to the material container and collection vessel (and if desired through the collection vessel to the sieve, at least the inlet side of the compressor and depending on its construction to the heat exchanger) to remove substantially all oxygen from the system to thereby avoid any potentially combustible oxygen and solvent mixture being present in the apparatus system. Typically, the PLC would control and verify the pressure and temperature of the solvent in the solvent tank to ensure it is at a desired temperature to supply liquid state solvent to the material container. If needed the PLC will control the chiller unit to achieve this temperature. If desired, the PLC also may be programmed to use the input of the weight sensor 220 to determine if the solvent tank 24 has enough liquid solvent in it to run the complete process. When the solvent in the tank is at this desired temperature the PLC will open and control the valve 214 to transfer liquid solvent into the material container 26 to a desired level of liquid solvent therein which may be sensed by its associated level sensor 240 and when this level is reached the PLC will initiate closure of this solvent flow control valve. Thereafter, the plant material in the material container will be contacted with or soaked in the liquid solvent for a period of time ($T_1$) inputted by the operator for the specific process to be run by the extractor apparatus. When this period of time is completed the PLC will open the control valve 234 to transfer the liquid solvent and extracted plant oil mixture to the collection vessel 28 and then upon completion of this transfer close this valve. If desired, for a particular process another quantity of liquid solvent from the solvent tank may be transferred into the material container to further contact and/or soak the plant material therein for a second period of time ($T_2$) to obtain a further plant oil and solvent mixture and when this second time period ($T_2$) expires the PLC will open the solenoid valve 234 to transfer this further solvent and plant oil mixture to the collection vessel 28 and then close this valve. Usually this second period of time ($T_2$) is substantially less than the first period of time ($T_1$).

Next, the PLC typically initiates heating of the collection vessel 28 and the sieve 30, turns on the compressor pump 32 and initiates flow of coolant through the heat exchanger 34. The PLC also opens the valves 258, 268, 274, and 278 to permit the flow of gaseous solvent from the collection vessel into and through the sieve, to the compressor pump 32, and compressed solvent gas through the heat exchanger 34 where at least most if not all of the solvent gas is condensed to a liquid state and returned to the solvent tank 24. In the collection vessel the liquid solvent is heated sufficiently to be converted to a gaseous state and thereby be separated from the plant oil which accumulates in the bottom of the collection vessel. The period of time ($T_3$) of heating of the collection vessel 28 and sieve 30, operation of the compressor 38 and circulation of coolant through the heat exchanger 34 may be either initially programmed by an operator entering this time through the HMI to the PLC or with suitable software the PLC can monitor the temperature, pressure, and liquid level in the collection vessel to determine a suitable period of time $T_3$ to ensure that essentially all of the liquid solvent in the collection vessel is converted to a gas state and transferred from the collection vessel. After the $T_3$ period of time is completed, the PLC may discontinue heating of the collection vessel 28 and the sieve 30, turn off the compressor 32, discontinue circulation of coolant through the heat exchanger 34, and close the valves 258, 268, 274, and 278. Thereafter, the plant oil may be removed from the collection vessel 28 typically for further processing. The plant oil may be removed through a drain valve plumbed to the bottom of the collection vessel and movable to open and closed states. This drain valve may be either a manual drain valve 250 which is manually opened and closed by an operator and opened when it is desired to remove plant oil from the collection vessel or a solenoid actuated drain valve 252 controlled by the PLC and opened and closed by an operator through the HMI. If desired, after the time period $T_3$ is completed and prior to removing the plant oil from the collection vessel, the valve 242 may be opened to provide a vacuum to the collection vessel for a short period of time to remove any gaseous solvent remaining in the collection vessel and then closed and desirably the pressure within the collection vessel returned to atmospheric pressure or if desired to a relatively low super-atmospheric pressure to increase the flow rate of plant oil out of the collection vessel when the drain valve is open.

With suitable software, the PLC throughout the process may monitor the temperature, solvent level, and pressure inside the solvent tank 24, material container 26, and collection vessel 28 and the inlet and outlet pressures of the sieve 30, and make any needed adjustments to the various temperatures, pressures, and/or liquid levels to expedite and improve the efficiency of the process. The PLC may also monitor the enclosure 22 of the extraction apparatus through an appropriate sensor for any hydrocarbon solvent leaks or other harmful effects, and if detected close all of the solenoid valves, shutdown the process and maximize the cubic foot per minute flow rate of the exhaust fan to avoid the creation of a potential fire or explosive condition in the enclosure. If desired, process data may be logged by the PLC for each batch of plant material processed by the extraction apparatus 20 so that an operator may see the exact conditions in each of the solvent tank, material container and collection vessel that occurred throughout the extraction process.

If desired a single operator may run a plurality of these extractor apparatuses 22 such as 4-6 apparatuses since each apparatus automatically carries out an extraction process and only requires an operator to load plant material into the material container and after extraction of plant oil to remove the material container, and to enter a limited amount of data for an apparatus to automatically run a specific process and if desired manually remove plant oil from the collection vessel.

While the form of the extraction apparatus disclosed herein constitutes presently preferred embodiments, many others are possible. It is not intended herein to mention all the possible equivalent forms or ramifications or advantages of the invention. It is understood that the terms used herein are merely descriptive, rather than limiting, and that various changes may be made without departing from the spirit or scope of the invention.

The invention claimed is:

1. A plant oil extraction apparatus comprising:
a solvent tank configured to receive a volatile solvent;
a plant material container connected through a first valve movable to open and closed states with the solvent tank to receive at least some volatile solvent from the solvent tank;
a chiller configured to cool volatile solvent in the plant material container to maintain at least some of such volatile solvent in a liquid state in contact with oil bearing plant material in the plant material container;
a collection vessel connected through a second valve movable to open and closed states to the material container to receive at least some of a mixture of volatile solvent and plant oil from the material container;
a heater configured to heat at least some liquid state volatile solvent in the collection vessel to a gas state;
a compressor configured to receive through a third valve movable to open and closed states at least some volatile solvent gas from the collection vessel and to compress at least some of the volatile solvent gas to a higher pressure;
a heat exchanger configured to receive at least some compressed volatile solvent gas from the compressor and to cool and condense at least part of the compressed volatile solvent gas to a liquid state and the heat exchanger connected through a fourth valve movable to open and closed states to return at least the liquid volatile solvent from the heat exchanger to the solvent tank;
a first pressure sensor and a first temperature sensor each associated with the solvent tank, a second temperature sensor and a second pressure sensor each associated with the material container and a third temperature sensor and a third pressure sensor each associated with the collection vessel;
a programmable electronic controller configured to receive inputs from the temperature sensors and the pressure sensors and to control the first valve to transfer volatile solvent from the solvent tank to the material container, to control the chiller to maintain at least part of the solvent in the material container in a liquid state, to control the second valve to transfer a mixture of liquid volatile solvent and plant oil to the collection vessel, to control the heater to heat at least part of the liquid solvent in the collection vessel to a gas state, to control the third valve to transfer at least part of the solvent gas from the collection vessel to the compressor, and to control the fourth valve to transfer at least volatile solvent in the liquid state from the heat exchanger to the solvent tank;
an enclosure enclosing the solvent tank, material container, collection vessel, compressor, and heat exchanger; and
an exhaust system configured to produce a forced air flow through the enclosure and exhausting to the exterior of the enclosure;
wherein the enclosure also comprises an operator access door movable to closed and open positions and when open, the operator access door is spaced above an upper portion of the material container, and an air duct carried by the operator access door and configured to produce air flow over at least the upper portion of the material container and into the air duct and to the exterior of the enclosure at a location spaced from the operator access door at least when it is open.

2. The apparatus of claim 1 which also comprises a solvent tank inlet connected through a fifth valve movable to open and closed states by the programmable logic controller to supply an inert gas at a superatmospheric pressure to the solvent tank.

3. The apparatus of claim 1 which also comprises a purge valve movable to open and closed states by the programmable logic controller and communicating with the material container or the collection vessel or both.

4. The apparatus of claim 1 which also comprises a valve movable to open and closed states by the programmable logic controller and configured when open to communicate a source of vacuum with the material container or the collection vessel or both.

5. The apparatus of claim 1 which also comprises a valve movable to open and closed positions by the programmable logic controller and communicating with the solvent tank and operable to control a supply of volatile solvent to the solvent tank.

6. The apparatus of claim 1 which also comprises a weight sensor associated with the solvent tank to provide an input to the programmable logic controller indicative of the weight of liquid volatile solvent in the solvent tank.

7. The apparatus of claim 1 wherein the material container is movably mounted in the enclosure and configured to be movable between a first position completely within the enclosure with the operator access door closed, and with the operator access door open to a second position wherein an upper end of the material container is disposed at least in part under and spaced below the open door and at least part of the air duct carried by the door.

8. The apparatus of claim 1 which also comprises a cover movably carried by the material container so that it can be manually moved between a first position closing an operator access opening of the material container and a second open position spaced from and not overlying the operator access opening.

9. The apparatus of claim 1 which also comprises a solvent level sensor associated with the solvent tank and configured to provide an input to the programmable logic controller indicating the level of solvent in a liquid state in the solvent tank.

10. The apparatus of claim 1 which also comprises a level sensor associated with the material container and configured to provide an input to the programmable logic controller indicating the level of solvent in a liquid state in the material container.

11. The apparatus of claim 1 which also comprises a level sensor operably associated with the collection vessel and configured to provide an input to the programmable logic controller indicating the level of a mixture of plant oil and solvent in a liquid state in the collection vessel.

12. The apparatus of claim 1 which also comprises a fire suppression system with at least one outlet nozzle within and adjacent the top of the enclosure and configured for discharging a fire suppression agent into the interior of the enclosure.

13. The apparatus of claim 1 which also comprises an access opening adjacent the upper end of the material container, a removable cover configured to close the access opening, and a material cartridge configured to be insertable through the access opening into the material container and which can be completely received within the material container when the cover closes the access opening.

14. The apparatus of claim 1 which also comprises a sieve in fluid communication with the collection vessel.

15. The apparatus of claim 1 which also comprises an operator human machine interface accessible from the exterior of the enclosure by an operator for inputting data into the programmable logic controller.

16. The apparatus of claim 1 which also comprises a human machine interface accessible from the exterior of the enclosure and configured to permit an operator to enter data into the programmable logic controller and a display screen configured to display a process and instrumentation diagram of at least some of a process carried out by the extraction apparatus.

* * * * *